United States Patent [19]

Whitehouse et al.

[11] Patent Number: 5,050,822
[45] Date of Patent: Sep. 24, 1991

[54] WING FLAP AERODYNAMIC NOISE SUPPRESSION

[75] Inventors: Ian R. Whitehouse; James K. Chu, both of Herts, England

[73] Assignee: British Aerospace Public Limited Company, London, England

[21] Appl. No.: 452,834

[22] Filed: Dec. 21, 1989

[30] Foreign Application Priority Data

Dec. 21, 1988 [GB] United Kingdom ............... 8829836

[51] Int. Cl.[5] .............................................. B64C 3/50
[52] U.S. Cl. ................................... 244/215; 244/216; 244/1 N
[58] Field of Search ............... 244/213, 215, 216, 130, 244/1 N

[56] References Cited

U.S. PATENT DOCUMENTS

| | | | |
|---|---|---|---|
| 2,289,704 | 2/1940 | Grant | 244/225 |
| 2,920,844 | 1/1960 | Marshall et al. | 244/216 |
| 4,015,787 | 4/1977 | Maieli et al. | 244/215 |
| 4,120,470 | 10/1978 | Whitener | 244/213 |
| 4,131,252 | 12/1978 | Dean et al. | 244/212 |

FOREIGN PATENT DOCUMENTS

| | | |
|---|---|---|
| 0154047 | 9/1985 | European Pat. Off. . |
| 1943680 | 6/1982 | Fed. Rep. of Germany ...... 244/215 |
| 3621401 | 1/1988 | Fed. Rep. of Germany . |
| 1546878 | 11/1967 | France ................................. 244/213 |
| 475163 | 11/1937 | United Kingdom . |
| 1275358 | 5/1972 | United Kingdom . |

*Primary Examiner*—Joseph F. Peters, Jr.
*Assistant Examiner*—Linda L. Palomar
*Attorney, Agent, or Firm*—Cushman, Darby & Cushman

[57] ABSTRACT

An arrangement for suppressing aerodynamic noise generated by cavity effect interaction between a wing flap shroud and one or more partially deployed trailing edge flaps. Noise suppression vanes are so positioned with respect to the shroud lower trailing edge and the leading edge of the wing flaps at partial deployment that eddies and vortices resulting from airflow separation at the shroud lower surface are diverted sufficiently by the noise suppression vanes to avoid significant noise inducing impingement of the separated flow on the flap leading edge.

5 Claims, 4 Drawing Sheets

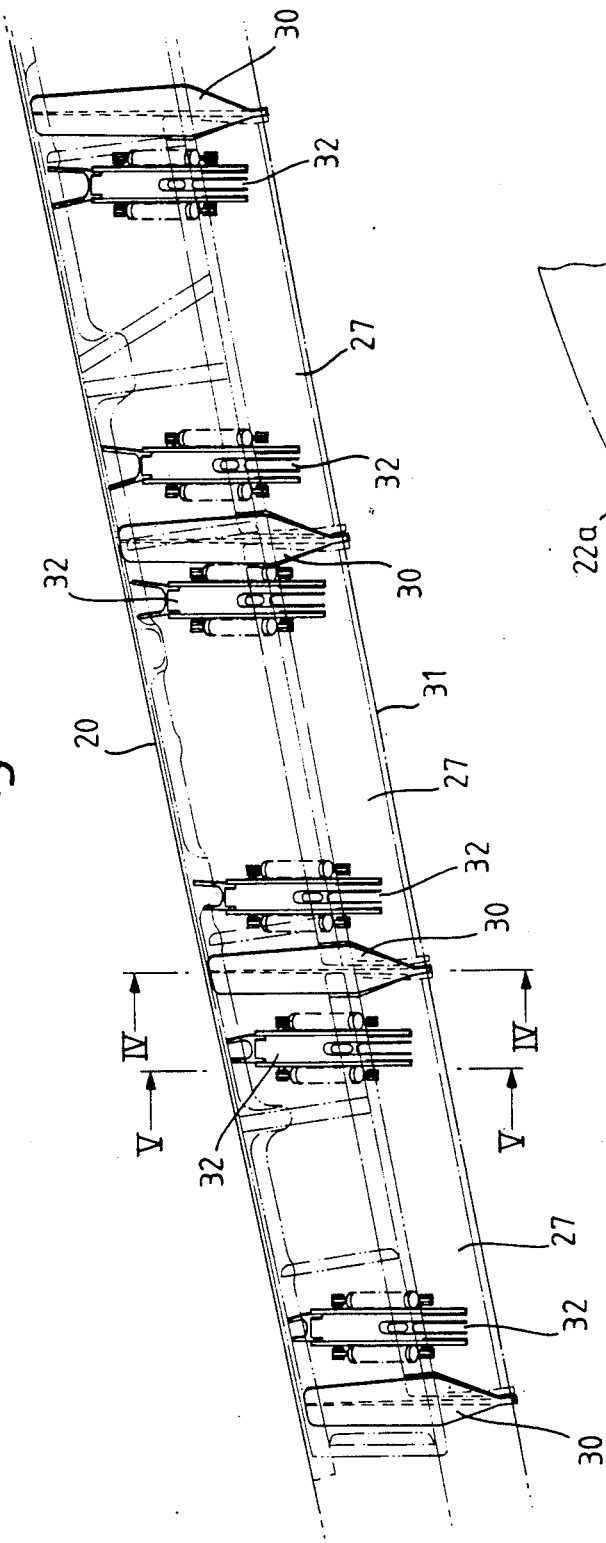
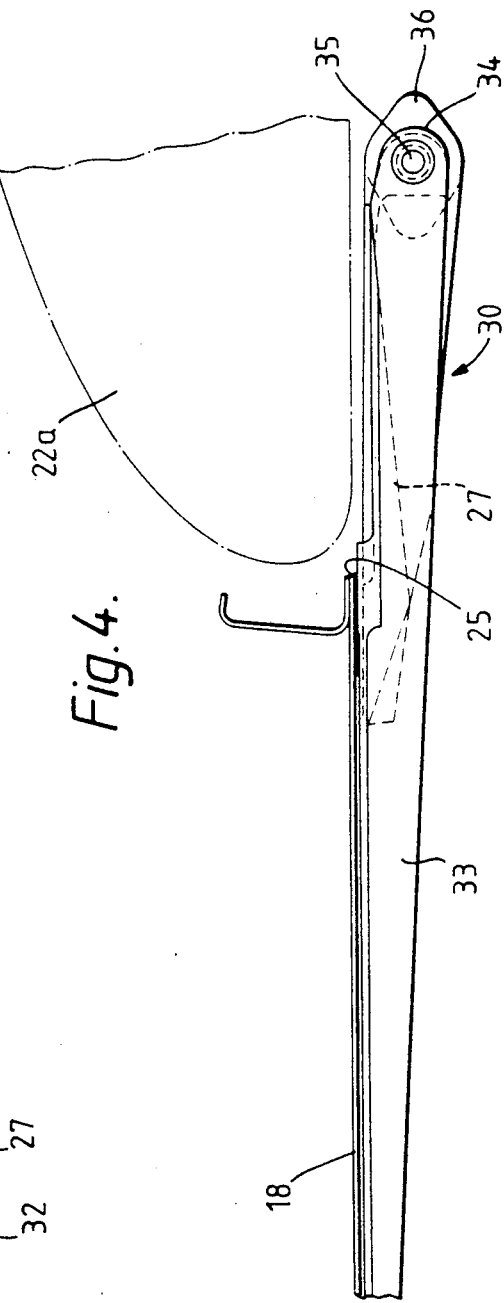

WING FLAP AERODYNAMIC NOISE SUPPRESSION

BACKGROUND OF THE INVENTION

1. Field of the Invention:

This invention relates to flap hoot suppression means associated with aircraft wing flap systems.

2. Description of the Prior Art

Flap hoot is the description applied to aerodynamically generated noise associated with a fully or partially deployed wing flap in flight and arises as a consequence of flow interaction between the flap and the flap gap/shroud geometry. It is normally distinguished by a discrete tone or range of tones as opposed to aerodynamic or mechanical noise normally associated with deployed or deploying flap systems. Even where a significant hoot is present it may only be obvious to passengers in certain circumstances or with aircraft of certain configurations. For example, if a high wing aircraft exhibits hoot it is likely to be more audible to the passenger in the cabin than in a low wing configuration in which the source is shielded. It is the object of the present invention to provide the means to suppress flap hoot.

SUMMARY OF THE INVENTION

According to the present invention there is provided an aircraft wing including means for suppressing aerodynamic noise generated, by cavity effect, as a result of airflow interaction between a wing flap lower shroud and one or more deployed trailing edge flaps, and comprising:

an aircraft wing having a flap shroud one or more spanwise extending trailing edge flaps located upon said wing and movable between a stowed cruise configuration and one or more selected flight settings whereby a slot is formed between the upper shroud lower surface and said trailing edge flap and, one or more spanwise noise suppression vanes associated with each trailing edge flap portion, the arrangement being such that said noise suppression vanes are so positioned with respect to the lower shroud trailing edge and the leading edge of said trailing edge flap or flaps when said flap or flaps are partially or fully extended that eddies and vortices resulting from airflow separation at the termination of the shroud lower surface trailing edge are diverted sufficiently by said noise suppression vanes into the slot so avoiding significant noise inducing impingement of said separated flow on said flap leading edge.

Preferably said noise suppression vanes are retractable such that when the trailing edge flap is in its stowed, cruise position they lie substantially abutting the wing lower skin surface or stowed within the wing structure.

An essential feature of the vane is that any eddies or vortices shed from its own trailing edge do not themselves impinge upon the leading edge of the flaps upon or during deployment in such a way as to cause hoot.

BRIEF DESCRIPTION OF THE DRAWING

One embodiment of the invention will now be described, by way of example only, with reference to the accompanying drawings in which:

FIG. 3 illustrates, in plan view, a spanwise portion of flap shroud incorporating suppression vane mounting and deployment means.

FIG. 4 illustrates a typical suppression vane mounting viewed in direction of arrows 4-4 in FIG. 3.

DETAILED DESCRIPTION OF THE PRESENTLY PREFERRED EXEMPLARY EMBODIMENT

Figure 7:
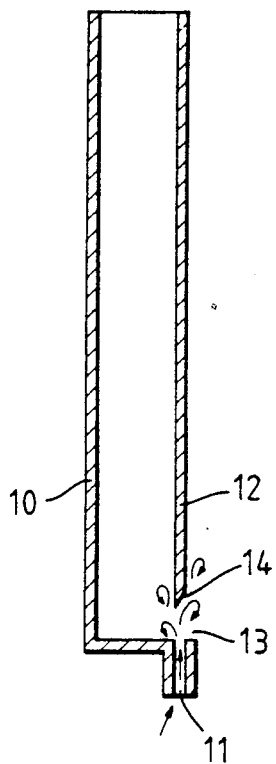
FIG. 7 illustrates diagrammatically the principle of sound generation in an organ type instrument forming the basis of hoot generation.
Figure 8:
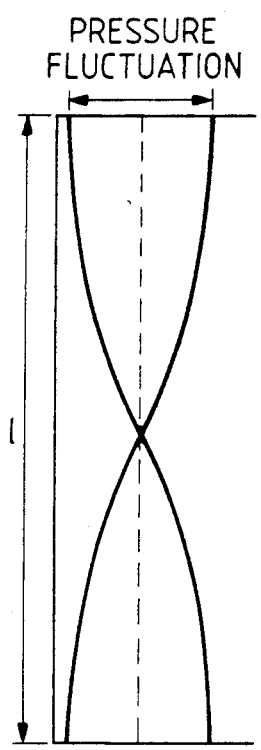
FIG. 8 graphically illustrates, as an adjunct to FIG. 7, the fundamental vibration in an open pipe.

Referring firstly to FIG. 7 and 8, it is considered that flap hoot is generated in much the same way as a note created by an organ, flute or recorder. The generation of sound from an organ pipe is briefly discussed with reference to FIG. 7.

An organ pipe 10 includes an air inlet pipe 11 and a splitter edge 14 located as the leading edge of the pipe wall 12. Air under pressure passes through the air inlet pipe 11, and the emerging jet on the upstream side, interacting with lower energy air, creates eddies 13. These eddies impinge upon the splitter 14 and break alternately to each side. This causes local variations in air pressure which influence the body of air within the organ pipe and sets up a standing wave; the fundamental frequency $f_o = (v/2l)$ where $v$ = speed of sound and, as illustrated in FIG. 8, the frequency of the wave depends on the length of pipe 'l' and whether the extreme end of the pipe is opened or closed. As long as it is within certain limits the rate of generation and the size of the eddies does not affect the sound frequency. In the example given, the pipe wall 12 is shown with a chamfered splitter edge 14 but a simple experiment with a recorder having a more rounded splitter edge demonstrated that the instrument will still work.

Figure 1:
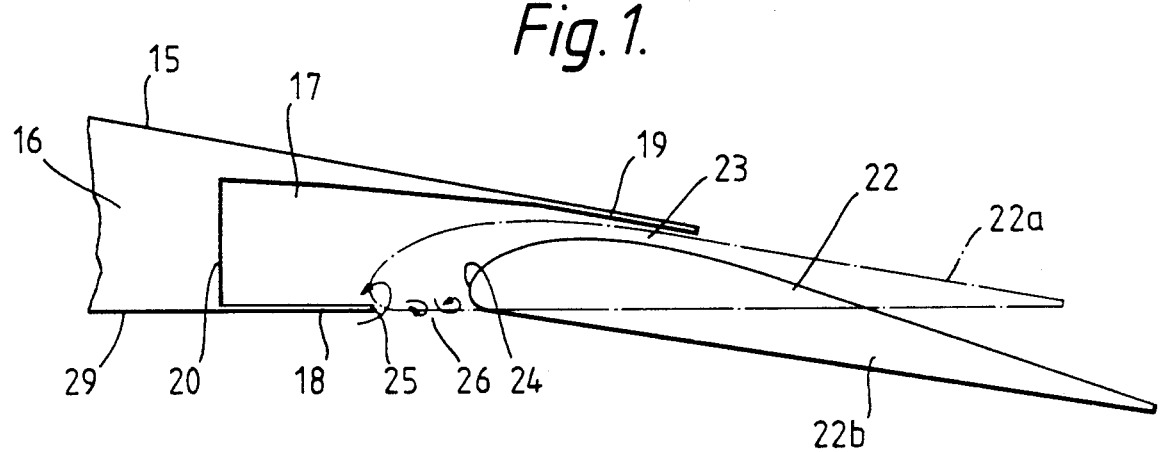
FIG. 1 illustrates diagrammatically a side elevation on a trailing edge portion of wing with a partially deployed trailing edge flap.

This may now be compared to the circumstances under which flap hoot occurs. Referring to FIG. 1, this illustrates a trailing edge portion 15 of wing 16 comprising a flap shroud having a lower portion 18 and an upper portion 19 both extending rearwardly of a structural member, e.g. a wing rear spar web, 20 forming a flap shroud cavity 17. A wing trailing edge flap 22 is shown in two settings, a stowed, cruise setting 22a, shown in chain-dot line and a partially deployed take-off setting 22b in which the flap is translated rearwardly as shown to define an aerodynamic slot 23 between the flap upper surface and the upper shroud surface 19, and a separation between the flap leading edge 24 and the rearward edge 25 of the lower shroud 18. Airflow passes along the wing lower surface to the rearward edge 25 where flow separation occurs at the edge and eddies and vortices 26 are formed. Under some conditions these may impinge upon the leading edge 24 of the flap and will pass to either side, i.e., to the upper and lower surfaces of the flap causing an oscillating pressure which may intiate and sustain a standing wave with the flap shroud cavity 17 acting as a resonant cavity.

The problem can be tackled in two ways either by damping out the sound or by preventing it from being generated in the first place. Damping is not considered to be a satisfactory expedient due to the relatively low frequencies experienced and the consequently large scale of damping material required for effective damping measures. A number of schemes, designed to interfere with the sound generation system have been tested with varying degrees of success, including means to alter the flow leaving the lower trailing edge portion 18 so that it no longer impinges upon the flap in such a way as to cause a hoot. Some, at least, of these resulted in unacceptable cruise drag penalties. Acoustically the most promising comprised a group which may be broadly described as scoops but these were to a certain extent impracticable in terms of retraction, a necessary requirement during the drag sensitive cruise flight mode except on aircraft types for which drag considerations are of lesser consideration. Furthermore certain scoops of flat plate manufacture, whilst satisfactory in performing the function, were themselves subject to causing eddy and vortex flows which in certain situations tended to impact the flap leading edge with resultant hoot generation.

Figure 2:
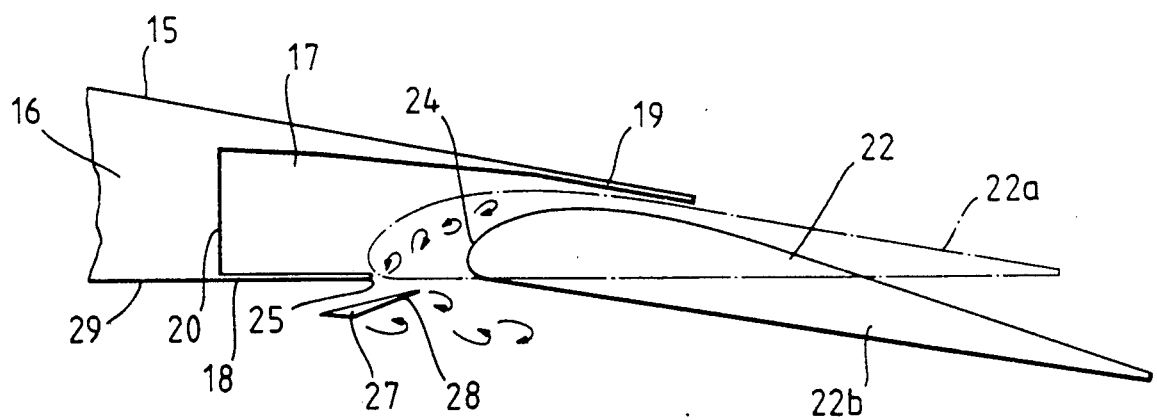
FIG. 2 illustrates diagrammatically the same arrangement but including a flap hoot suppression vane in accordance with the invention.
Figure 9:
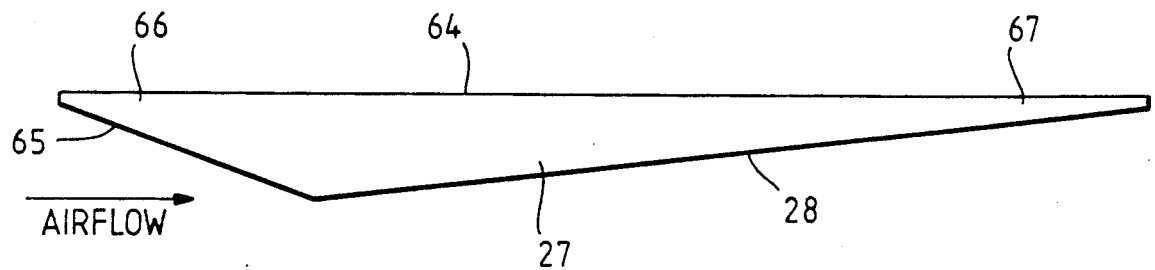
FIG. 9 illustrates, in cross-section the preferred vane configuration in accordance with the invention.

By experimentation it was determined that a vane 27 which lends itself more easily to retraction in the cruise mode offered the best solution. As illustrated in FIGS. 2 and 9 it is preferably of wedge shaped cross-sectional configuration and is designed and positioned relative to the wing lower surface such that the eddies arising from the airflow will not impinge upon the flap leading edge or will do so in such a manner as to avoid hoot creation. It has been found, in the arrangement of FIG. 2 that the vane 27 should be so positioned that the airflow over the rear vane surface 28 facing away from the wing lower surface 29 should be separated flow. This should not be considered as limiting the invention, but is a preferable arrangement and it is accepted that a similar effect might be achieved with attached flow on a vane positioned differently relative to the deployed flap 22b and the trailing edge portion 18. The section and position of the vane 27 is such that it can be retracted or closed against the lower surface 29 of the wing in order to minimise the cruise drag penalty. One practical embodiment of the installation will now be described with reference to FIG. 3-6 inclusive.

Referring first to FIG. 3 which illustrates, in plan view, by way of example, a spanwise portion of wing trailing edge shroud including suppression vane assembly and deployment means. For clarity, the shrouds are illustrated lightly in chain-dot line. The portion of span illustrated here substantially equates to one section of trailing edge flap (not shown) and three spanwise segments of suppression vane 27 which, in combination, match the span of the flap. Each segment of suppression vane 27 is hingedly supported at each end off mounting assemblies 30 to be later described with reference to FIG. 4. The vanes 27 are moveable with respect to the wing about a common hinge line 31. The assembly includes twin vane deployment and retracting assemblies (32) per vane segment as hereinafter described and illustrated in FIGS. 5 and 6.

FIG. 4 illustrates a typical vane mounting assembly 30 located beneath the lower shroud surface 18, the wing flap 22a being shown, in chain-dot line, in the stowed cruise configuration and the vane 27 in its retracted position. Vane mounting assemblies 30 each comprise a mounting bracket 33 extending rearwardly beyond the trailing edge 25 and terminating in a lug-end 34 incorporating a pivotal attachement 35, whose axis is co-incident with the vane hinge axis 31, for pivotally mounting the vane by means of a corresponding attachement 36 located at each end of the vane. The typical vane mounting assembly is common at each termination except that in the case of the inner stations each mounting bracket provides double pivotal attachement.

Figure 5:
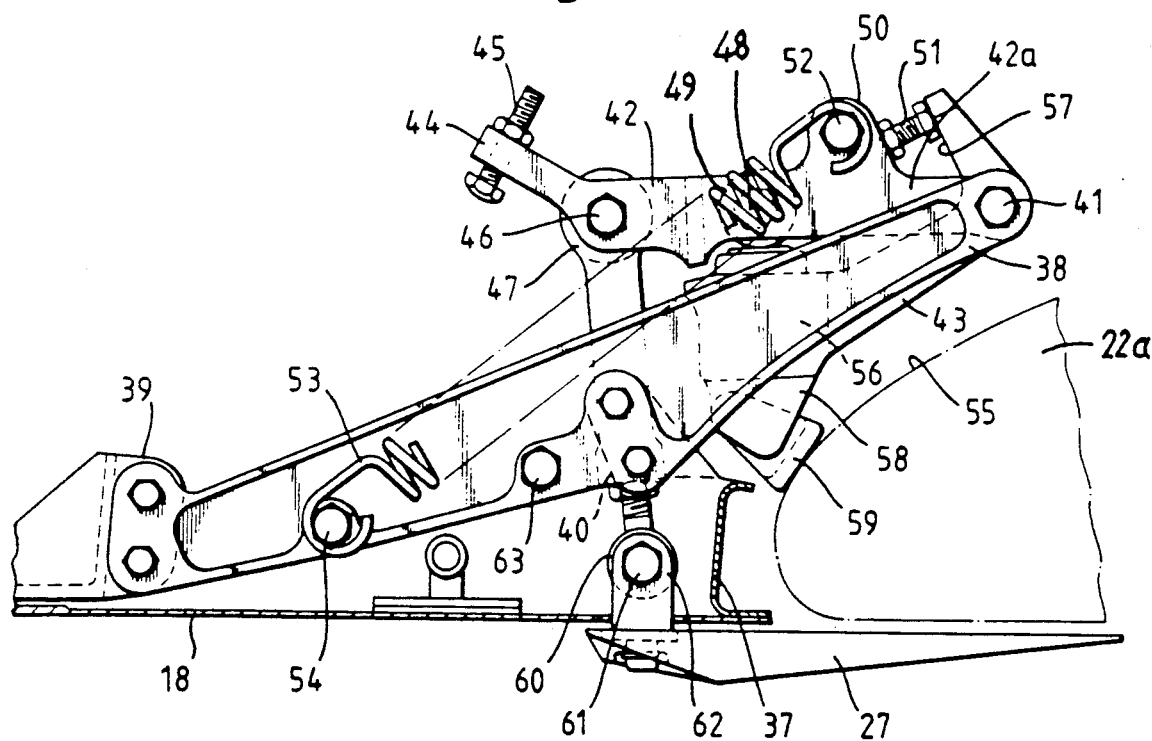
FIG. 5 illustrates in cross-section side elevation, one embodiment of suppression vane actuating mechanism viewed in direction of arrows 5-5 in FIG. 3.

The vane deployment and retracting mechanism 32 is now described with reference to FIGS. 5 and 6 and, as shown in FIG. 3 there are two such mechanisms per vane segment 27, preferably located adjacent each end. In FIG. 5 the lower shroud surface 18 is shown having a spanwise extending rearwardly facing channel edge member 37. The vane 27 is shown in its fully retracted position lying closely adjacent the lower shroud lower surface 18 and extending rearwardly beneath the stowed wing flap 22a. The mechanism includes a diagonal mounting beam 38 having bolted attachments to mounting brackets 39 and 40 located to the shroud structure. The upper end of the mounting beam includes a co-incidental pivotal attachement 41 to a radius arm assembly 42 comprising a beam 42a and an actuation input lever 43. The beam 42a includes at its forward end a leg 44 incorporating an adjustable stop 45, a pivotal attachement 46 to the upper end of a turnbuckle 47, a pivotal attachement 48 mounting a roller 49 and a fork extension 50 incorporating an adjustable stop 51 and providing an upper attachment point 52 for a spring 53 whose lower end is attached to the mounting beam 38 at 54. The actuation input lever 43 lies substantially parallel to the flap upper surface 55 in the vicinity of the flap leading edge and includes a pressure pad assembly 56 lying normal to the lower surface of the beam 42a and in contact with the roller 49, an integrally machined stop 57 in contact with the adjustable stop 51 and a downwardly inclined lug 58 rigidly mounting a flap bearing pad 59. The turnbuckle 47 extends downwardly its lower adjustable eye end 60 pivotally located at 61 to a fork end fitting 62 attached to the vane 27 and extending upwards through a clearance hole in the lower shroud surface 18. The bolt 63 in the mounting beam 38 constitutes a stop for the adjustable stop 45. The assembly is jigged and adjusted such that with the flap 22 in its fully stowed position, 22a the vane 27 is correspondingly stowed and the radius arm assembly 42 restrained against any angular displacement by means of the bearing pad 59 in surface contact with the flap leading edge 24, the assembly being spring loaded by means of the spring 53.

Figure 6:
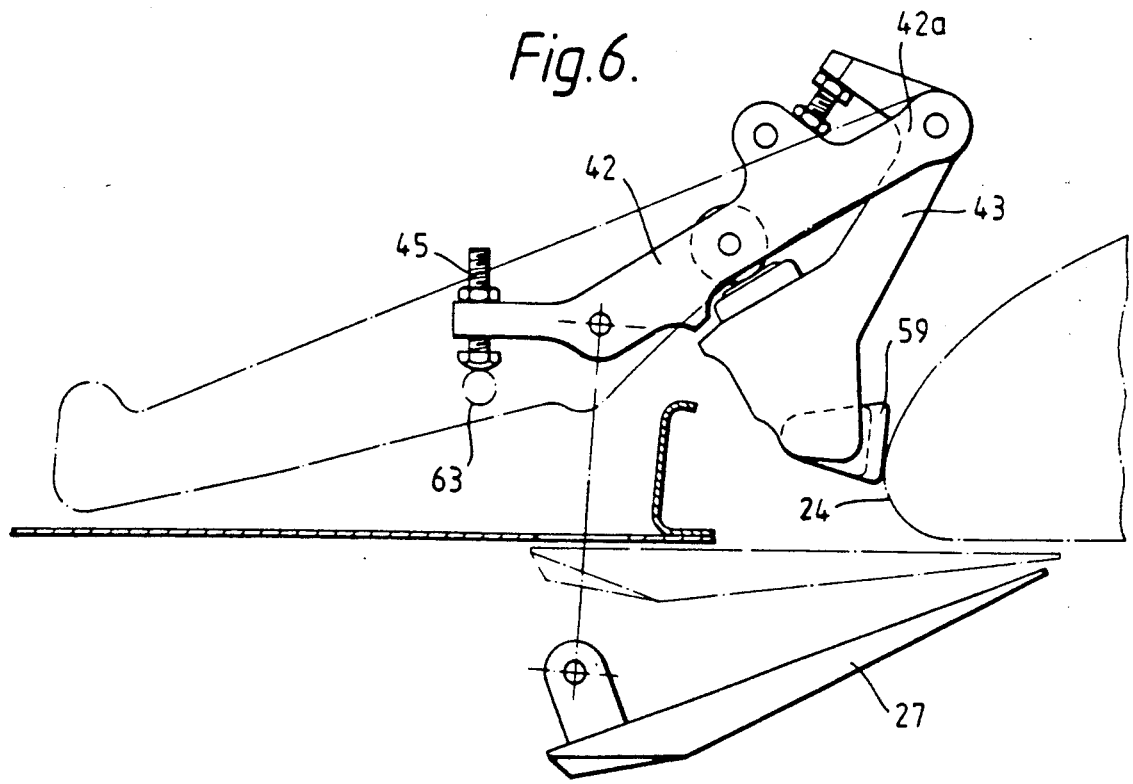
FIG. 6 illustrates, in partial diagrammatic form, the arrangement of FIG. 5 with the suppression vane deployed.

As shown in FIG. 6, as the wing flap 22a is translated rearwardly, i.e., it moves away from its stowed position as shown in FIG. 2, the spring tension induces a corresponding rotation of the radius arm assembly in an anti-clockwise sense about its pivot centre 41 extending the vane 27 from its stowed to fully deployed position, achieved when the adjusting screw 45 engages the stop 63. Conversely, when the flap is translated forwardly back to the stowed cruise condition the leading edge 24, contacting the bearing pad 59 rotates the radius rod assembly in a clock-wise sense, simultaneously drawing the vane 27 upwardly into its retracted stowed location.

Although a vane of particular cross-sectional configuration together with one stowage and retraction arrangement is described here by way of example, other configurations and arrangements may be utilised without in any way departing from the scope and spirit of the invention. In the preferred configuration as shown in FIG. 9, the vane 27 includes a first inner surface profile 64 configured to substantially conform to the wing lower surface where stowed, a second forward outer surface 65 lying at an acute angle with respect to the inner surface profile to form a wedge-shaped leading edge 66 and a third rearward outer surface 28 lying at an acute angle with respect to the first inner surface 64 to form a wedge-shaped trailing edge 67.

We claim:

1. An aircraft wing including means for suppressing aerodynamic noise generated by a cavity effect, as a result of airflow interaction between a wing flap lower shroud and at least one deployed trailing edge flaps, comprising:

an aircraft wing having a flap shroud,
   at least one spanwise extending trailing edge flap located upon said wing and movable between a stowed cruise configuration and at least one selected flight setting whereby a slot is formed between a lower surface of an upper portion of said flap shroud and said trailing edge flap, and
   at least one spanwise noise suppression vane associated with each trailing edge flap portion, said noise suppression vane being movable separate from movement of said trailing edge flap,
   wherein said noise suppression vane is so positioned with respect to a lower shroud trailing edge and a leading edge of said trailing edge flap when said flap are at least partially deployed that eddies and vortices resulting from airflow separation at the termination of the shroud lower surface are diverted sufficiently by said noise suppression vane into the slot so that there is no significant noise inducing impingement of said separated flow on said flap leading edge.

2. An aircraft wing according to claim 1 in which the noise suppression vanes are mounted upon said wing and are movable from a stowed location substantially abutting the wing lower surface to a deployed flow diverting location.

3. An aircraft wing according to claim 2 in which the noise suppression vanes are movable from said stowed location to said deployed flow diverting location as a function of wing trailing edge flap movement.

4. An aircraft wing including means for suppressing aerodynamic noise generated by a cavity effect as a result of airflow interaction between a wing lower surface shroud and at least one trailing edge flap, comprising:

an aircraft wing having a flap shroud,
   at least one spanwise extending trailing edge flaps mounted upon said wing and movable between a stowed cruise configuration and at least one selected flight settings whereby a slot is formed between the upper shroud lower surface and said trailing edge flap, and
   at least one spanwise noise suppression vanes associated with each trailing edge flap portion being mounted upon said wing and movable as a function of wing trailing edge flap deployment from a stowed location substantially abutting the wing lower surface to a deployed flow diverting location,
   wherein said noise suppression vane being substantially wedge shaped and having a first inner surface profile configured to substantially conform to the wing lower surface profile when stowed, a second forward outer surface lying at an acute angle with respect to the first inner surface profile to form a wedge shaped leading edge and a third rearward outer surface lying at an acute angle with respect to the first inner surface profile to form an opposing wedge shaped trailing edge, and
   wherein the noise suppression vanes is positioned with respect to the lower shroud trailing edge and the edge of said trailing edge flap when said flap is at least partially deployed so that eddies and vortices resulting from airflow separation at the termination of the shroud lower surface are diverted sufficiently by said noise suppression vane into the slot so that there is no significant noise inducing impingement of said separated flow on said flap leading edge.

5. An aircraft wing according to claim 4 wherein the noise suppression vane includes mounting and actuating means located upon the aircraft wing structure comprising:

noise suppression vane attachment means,
   said suppression vanes having first pivotal attachment means adjacent its trailing edge and second pivotal attachment means adjacent its leading edge,
   at least two first mounting beams extending rearwardly of said wing structure and to which said suppression vane is pivotally located at said first pivotal attachment means,
   at least one second mounting beam extending rearwardly from within the flap shroud and overlapping the flap leading edge when said flap is in its stowed location,
   a radius arm assembly including lever means and a radius arm constrained to move conjointly about a concentric pivotal attachment approximately at a rearward extremity of the second mounting beam, said radius arm further including a flap engaging stop maintained in contact with the flap when said flap is in its stowed location,
   spring means interconnecting said second mounting beam and said lever means, and
   adjustable link means having an upper pivotal attachment to said lever means and a lower pivotal attachment to the second pivotal attachment on said suppression vane,
   wherein when the flap is in its stowed location, the flap engaging stop restrains angular displacement of the radius arm assembly against induced spring tension, thus maintaining the suppression vanes in stowed location but flap deployment induces progressive spring induced angular rotation of the radius arm assembly and consequential controlled displacement of the suppression vane such that it adopts the desired flow diverting attitude with respect to the flap leading edge.

* * * * *